United States Patent
Boivie

(10) Patent No.: US 9,471,513 B2
(45) Date of Patent: *Oct. 18, 2016

(54) CACHE STRUCTURE FOR A COMPUTER SYSTEM PROVIDING SUPPORT FOR SECURE OBJECTS

(71) Applicant: International Business Machines Corporation, Armonk, NY (US)

(72) Inventor: Richard Harold Boivie, Monroe, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/062,676

(22) Filed: Mar. 7, 2016

(65) Prior Publication Data

US 2016/0188494 A1 Jun. 30, 2016

Related U.S. Application Data

(63) Continuation of application No. 12/878,696, filed on Sep. 9, 2010, now Pat. No. 9,298,894, which is a continuation-in-part of application No. 12/492,738, filed on Jun. 26, 2009, now Pat. No. 8,819,446.

(51) Int. Cl.
| | |
|---|---|
| *G06F 11/30* | (2006.01) |
| *G06F 12/14* | (2006.01) |
| *G06F 12/08* | (2016.01) |
| *G06F 21/72* | (2013.01) |
| *G06F 21/12* | (2013.01) |

(52) U.S. Cl.
CPC ....... *G06F 12/1408* (2013.01); *G06F 12/0802* (2013.01); *G06F 21/125* (2013.01); *G06F 21/72* (2013.01); *G06F 2212/1052* (2013.01); *G06F 2212/6042* (2013.01); *H04L 2209/12* (2013.01)

(58) Field of Classification Search
CPC .......... H04L 2209/12; G06F 12/0802; G06F 2212/1052; G06F 2212/6042; G06F 21/125; G06F 21/72
See application file for complete search history.

(56) References Cited

U.S. PATENT DOCUMENTS

| | | | |
|---|---|---|---|
| 5,222,139 A | 6/1993 | Takaragi et al. | |
| 5,481,613 A | 1/1996 | Ford et al. | |

(Continued)

FOREIGN PATENT DOCUMENTS

| | | |
|---|---|---|
| CN | 1309351 A | 8/2001 |
| JP | H 07287514 A | 10/1995 |

(Continued)

OTHER PUBLICATIONS

European Search Report dated Mar. 4, 2016.

(Continued)

*Primary Examiner* — Krista Zele
*Assistant Examiner* — James Forman
(74) *Attorney, Agent, or Firm* — Jeff LaBaw, Esq.; McGinn IP Law Group, PLLC

(57) ABSTRACT

A method that protects a confidentiality and an integrity of information in a secure object from other software on the system, said secure object comprising information that is cryptographically protected from the other software on the system, said method includes decrypting and integrity-checking information in the secure object as said information is brought into a cache from external memory.

20 Claims, 7 Drawing Sheets

(56) References Cited

U.S. PATENT DOCUMENTS

| | | |
|---|---|---|
| 5,615,263 A | 3/1997 | Takahashi |
| 5,748,782 A | 5/1998 | Ferreira et al. |
| 5,845,281 A | 12/1998 | Benson et al. |
| 6,185,685 B1 | 2/2001 | Morgan et al. |
| 6,397,331 B1 | 5/2002 | Ober et al. |
| 6,523,118 B1* | 2/2003 | Buer .................. G06F 21/85 380/28 |
| 6,704,871 B1 | 3/2004 | Kaplan et al. |
| 6,708,273 B1 | 3/2004 | Ober et al. |
| 6,751,709 B2 | 6/2004 | Seidl et al. |
| 6,968,420 B1 | 11/2005 | Giles et al. |
| 7,043,616 B1 | 5/2006 | McGrath |
| 7,055,040 B2 | 5/2006 | Klemba et al. |
| 7,136,488 B2 | 11/2006 | Hashimoto et al. |
| 7,167,956 B1 | 1/2007 | Wright et al. |
| 7,249,225 B1 | 7/2007 | Seidl et al. |
| 7,260,726 B1 | 8/2007 | Doe et al. |
| 7,290,288 B2 | 10/2007 | Gregg et al. |
| 7,483,930 B1 | 1/2009 | Wright et al. |
| 7,516,331 B2 | 4/2009 | Jin et al. |
| 7,747,877 B2 | 6/2010 | Jin et al. |
| 7,865,733 B2 | 1/2011 | Goto et al. |
| 7,933,413 B2 | 4/2011 | Steeves et al. |
| 8,041,947 B2 | 10/2011 | O'Brien et al. |
| 8,055,910 B2 | 11/2011 | Kocher et al. |
| 8,086,871 B2 | 12/2011 | McIntosh et al. |
| 8,108,641 B2 | 1/2012 | Goss et al. |
| 8,381,288 B2 | 2/2013 | Sahita et al. |
| 8,392,725 B2 | 3/2013 | McIntosh et al. |
| 8,464,011 B2 | 6/2013 | Krig |
| 8,479,286 B2 | 7/2013 | Dalcher et al. |
| 8,572,400 B2 | 10/2013 | Lin et al. |
| 8,738,932 B2 | 5/2014 | Lee et al. |
| 2001/0010722 A1 | 8/2001 | Enari |
| 2001/0014157 A1 | 8/2001 | Hashimoto et al. |
| 2001/0050990 A1 | 12/2001 | Sudia |
| 2002/0064283 A1 | 5/2002 | Parenty |
| 2002/0172368 A1 | 11/2002 | Peterka |
| 2004/0039926 A1 | 2/2004 | Lambert |
| 2004/0123127 A1 | 6/2004 | Teicher et al. |
| 2004/0139346 A1 | 7/2004 | Watt |
| 2004/0181303 A1 | 9/2004 | Walmsley |
| 2005/0038998 A1 | 2/2005 | Ueno |
| 2005/0044390 A1 | 2/2005 | Trostle |
| 2005/0076226 A1* | 4/2005 | Boivie .................. G06F 21/575 713/187 |
| 2005/0105738 A1* | 5/2005 | Hashimoto .............. G06F 21/72 380/277 |
| 2005/0166069 A1* | 7/2005 | Hashimoto .............. G06F 21/10 713/194 |
| 2005/0177742 A1 | 8/2005 | Benson et al. |
| 2006/0106801 A1 | 5/2006 | Cox et al. |
| 2006/0156418 A1 | 7/2006 | Polozoff |
| 2006/0242611 A1 | 10/2006 | Drake |
| 2007/0006294 A1 | 1/2007 | Hunter |
| 2007/0047735 A1 | 3/2007 | Celli et al. |
| 2007/0101124 A1 | 5/2007 | Pitts |
| 2007/0133795 A1 | 6/2007 | Kahn et al. |
| 2008/0072068 A1 | 3/2008 | Wang et al. |
| 2008/0109903 A1 | 5/2008 | Werner et al. |
| 2008/0155273 A1 | 6/2008 | Conti |
| 2008/0205651 A1 | 8/2008 | Goto et al. |
| 2008/0222420 A1 | 9/2008 | Serret-Avila |
| 2008/0270806 A1 | 10/2008 | Nakamura |
| 2008/0282093 A1 | 11/2008 | Hatakeyama |
| 2008/0288786 A1 | 11/2008 | Fiske |
| 2008/0301441 A1 | 12/2008 | Calman et al. |
| 2009/0006796 A1 | 1/2009 | Chang et al. |
| 2009/0006864 A1 | 1/2009 | Hashimoto et al. |
| 2009/0217385 A1 | 8/2009 | Teow |
| 2009/0259857 A1 | 10/2009 | Gehrmann |
| 2009/0300366 A1 | 12/2009 | Gueller et al. |
| 2009/0319782 A1 | 12/2009 | Lee |
| 2010/0031061 A1 | 2/2010 | Watanabe et al. |
| 2010/0119068 A1 | 5/2010 | Harris |
| 2010/0153746 A1 | 6/2010 | Takeuchi et al. |
| 2010/0161904 A1 | 6/2010 | Cypher et al. |
| 2010/0262824 A1 | 10/2010 | Keshavachar et al. |
| 2010/0281273 A1 | 11/2010 | Lee et al. |
| 2011/0064217 A1* | 3/2011 | Fry .................. G06F 21/78 380/46 |

FOREIGN PATENT DOCUMENTS

| | | |
|---|---|---|
| JP | 2001-230770 A | 8/2001 |
| JP | 2001-318787 A | 11/2001 |
| JP | 2002-232417 A | 8/2002 |
| JP | 2006-018528 A | 1/2006 |
| JP | 2006-209703 A | 8/2006 |
| JP | 2006-227777 A | 8/2006 |
| JP | 2006-309766 A | 11/2006 |
| JP | 2007-514994 A | 6/2007 |
| JP | 2007-233426 A | 9/2007 |
| JP | 2008-210225 A | 9/2008 |
| TW | 200822068 A | 5/2008 |
| TW | 200841682 A | 10/2008 |
| WO | WO 98/54633 A1 | 12/1998 |
| WO | WO 2005-096120 A1 | 10/2005 |
| WO | WO 2008/003833 A1 | 1/2008 |

OTHER PUBLICATIONS

Haifeng, et al. "Memory Confidentiality and Integrity Protection Method Based on Variable Length Counter", 2012, IEEE, p. 290-294.

Frincke, "Developing Secure Objects"; Google, 1995-1996.

Somogyi, et al., "NblDL: Secure, Object-Oriented, Client-Server Middleware", Google, 1998.

SAP Functions in Detail; "Crystal Reports Server—A Functional Overview", Google, 2008.

PCT Notification Concerning Transmittal of International Preliminary Report on Patentability dated Jan. 12, 2012 (PCT Application No. PCT/US2010/001811).

Henry Levy, Capability-Based Computer Systems, Published by Digital Press 1984. http://www.cs.washington.edu/homes/levy/capabook.

Theodore A. Linden, Operating System Structure to Support Security and Reliable Software, Institute for Computer Sciences and Technology, National Bureau of Standards, Washington, DC 20234 http://delivery.acm.org/10.1145/360000/356682/P409.linden.pdf— Abstract Only ACM Computing Survey (CSUR), vol. 8, Issue 4, Dec. 1976.

Canetti, et al., "A Two Layers Approach for Securing an Object Store Network", Proceedings of the First International IEEE Security in Storage Work-Shop (2002) (SISW'02), 1-14.

Wang, et al., "Keep Passwords Away from Memory: Password Caching and Verification Using TPM", 22$^{nd}$ International Conference on Advanced Information Networking and Applications, IEEE, 755-762, DOI: 10.1109/AINA, 2008.109.

Catrein, et al. "Private Domains in Networks of Information", IEEE International Conference Communications (ICC) Work-Shops, 2009.1-5.

PCT Notification of Transmittal of the International Search Report and the Written Opinion of the International Searching Authority, or the Declaration dated Oct. 1, 2010.

Williams, et al., "CPU Support for Secure Executables", The 4$^{th}$ International Conference on Trust and Trustworthy Computing, Jun. 22-24, 2011, Pittsburgh, PA.

Williams, et al., "CPU Support for Secure Executables" Stony Brook University, Power Point Presentation at the 4$^{th}$ International Conference on Trust and Trustworthy Computing, Jun. 22-24, 2011, Pittsburgh, PA.

United States Office Action dated Aug. 14, 2013 in U.S. Appl. No. 13/226,079.

United States Office Action dated Aug. 14, 2013 in U.S. Appl. No. 12/492,738.

United States Office Action dated Oct. 8, 2014 in U.S. Appl. No. 13/226,079.

(56) References Cited

OTHER PUBLICATIONS

United States Notice of Allowance dated Jul. 7, 2014 in U.S. Appl. No. 13/033,455.
United States Notice of Allowance dated May 5, 2014 in U.S. Appl. No. 12/492,738.
Suh, et al., "Efficient Memory Integrity Verification and Encryption for Secure Processors", 36th International Symposium on Microarchitecture, 2003 IEEE, pp. 1-12.
Yang, et al., "Fast Secure Processor for Inhibiting Software Piracy and Tampering", 36th International Symposium to Microarchitecuture, 2003 IEEE, pp. 1-10.
United States Office Action dated Feb. 12, 2014 in U.S. Appl. No. 12/492,738.
United States Office Action dated Mar. 19, 2014 in U.S. Appl. No. 13/226,079.
United States Office Action dated Oct. 4, 2013 in U.S. Appl. No. 12/878,696.
United States Office Action dated Mar. 13, 2015 in U.S. Appl. No. 13/226,079.
Haifend, "Memory Confidentiality and Integrity Protection Method Based on Variable Length Counter", Dec. 1, 2014, Journal of Algorithms & Computational Technology, pp. 421-439.
United States Office Action dated Nov. 23, 2015, in U.S. Appl. No. 14/454,075.
United States Office Action dated Jun. 26, 2015, in U.S. Appl. No. 12/878,696.
United States Office Action dated Nov. 9, 2012 in U.S. Appl. No. 13/033,367.
United States Office Action dated Mar. 26, 2012, in U.S. Appl. No. 12/492,738.
United States Office Action dated Dec. 3, 2014, in U.S. Appl. No. 14/454,075.
United States Office Action dated Dec. 3, 2014, in U.S. Appl. No. 14/017,555.
United States Office Action dated May 30, 2014, in co-pending U.S. Appl. No. 14/017,555.
United States Notice of Allowance dated Mar. 26, 2015, in U.S. Appl. No. 14/017,555.
United States Notice of Allowance dated Jul. 23, 2013 in U.S. Appl. No. 13/033,367.
Combined Search and Examination Report dated Dec. 20, 2012.
United States Office Action dated Jun. 5, 2013 in U.S. Appl. No. 12/492,738.
United States Office Action dated Mar. 25, 2013 in U.S. Appl. No. 13/033,367.
United States Office Action dated Nov. 20, 2012 in U.S. Appl. No. 13/033,455.
United States Office Action dated May 24, 2016, in U.S. Appl. No. 14/745,851.

* cited by examiner

CACHE STRUCTURE FOR A COMPUTER SYSTEM PROVIDING SUPPORT FOR SECURE OBJECTS

CROSS-REFERENCE TO RELATED APPLICATIONS

The present Application is a continuation in part to U.S. patent application Ser. No. 12/492,738, filed on Jun. 26, 2009, to Richard H. Boivie, entitled "SUPPORT FOR SECURE OBJECTS IN A COMPUTER SYSTEM", assigned to the present assignee, and incorporated herein by reference.

This Application is a Continuation Application of U.S. patent application Ser. No. 12/878,696, filed on Sep. 9, 2010.

BACKGROUND OF THE INVENTION

1. Field of the Invention

The present invention generally relates to protecting code and data on a computer system from other software on the system. More specifically, a new object identification label is provided in each cache line, the label identifying which, if any, secure object owns the data of that cache line, the data having been decrypted upon retrieval as an encrypted secure object from memory and placed in the cache, such that, if the data is indicated as owned by a secure object, the cache controller permits an access to that cache line data only by that secure object. If an access attempt is made by any other software, the cache line is invalidated and the encrypted version of the data is retrieved from memory and placed in that cache line, thereby ensuring that only the owner of the secure object has access to the secure object's decrypted data and/or code in the cache.

2. Description of the Related Art

The above-identified co-pending application introduced the notion of a 'secure object' comprising code and data on a computer system that is cryptographically protected from other software on the system, along with an exemplary computer architecture for supporting these secure objects.

FIG. 1 exemplarily shows such a computer architecture 100 that would implement the method described in this co-pending application, including microprocessor 101 having a CPU 102, L1 cache 103, L2 cache 104, interacting with external memory 105. Data and code in secure objects are stored in encrypted form in external memory 105 and, therefore, are inaccessible unless the encryption key is available for that secure object.

When a secure object executing on CPU 102 retrieves its encrypted information from external memory 105, the data and/or code of the retrieved secure object is decrypted in the crypto engine 106, using keys, temporarily stored in special crypto registers 107, The crypto engine 106 will again encrypt the secure object's data and/or code as it is written out to the external memory 105 via L2 cache 104. Thus, the secure object code and data remain decrypted (e.g., "in the clear") only while within the CPU 102 and L1 cache 103.

The present application extends the concepts described in the above-referenced co-pending application by describing a cache structure that improves the performance of a computer system providing support for secure objects by adding components and features into the architecture shown in FIG. 1, as further described below.

SUMMARY OF THE INVENTION

In view of the foregoing, it is an exemplary feature of the present invention to provide a structure (and method) in which efficiency using secure objects is further enhanced on a computer.

In summary, in relation to the method described in the parent application, the present invention provides a mechanism for protecting secure object data that is stored in an on-chip CPU cache in unencrypted form from other threads or processes that are unrelated to the secure object. The present invention derives in part by the present inventor noting that, from a performance perspective, it is advantageous to store secure object data in unencrypted form in the cache so that decryption is not required on each reference to data in the cache.

The present invention, therefore, further enhances performance in processing secure objects by providing a mechanism so that secure object data can be stored securely in unencrypted form in an on-chip cache in a multiprocessor chip in which one or more levels of cache memory space can be shared by more than one processor in the chip or in the system.

In a first exemplary aspect of the present invention, described herein is a method of enhancing efficiency in processing using a secure environment on a computer, including, for each line of a cache, providing an associated object identification label field associated with that line of cache, the object identification label field storing a value that identifies an owner of data currently stored in that line of cache.

In a second exemplary aspect of the present invention, also described herein is an apparatus, including a cache that includes a plurality of cache lines, each of the cache lines having an owner field identifying an owner, if any, of data stored in that cache line; and a cache controller that controls an access of the data stored in the cache line as based upon whether the access has been made by the owner identified in the owner identification field.

In a third exemplary aspect of the present invention, also described herein is a cache controller, including a data port receiving a value identifying an owner of a process or thread currently being executed by a central processing unit (CPU) associated with a cache controlled by the cache controller, the process or thread requesting access to data stored in a line of the cache; and a mechanism that causes the cache controller to determine if a value stored in an owner identification field of the requested line of cache matches the value received at the input port.

Thus, the present invention enhances the capabilities of the secure object support described in the parent application by permitting the secure object to execute safely and with high performance in a single-threaded CPU environment or in multi-threaded and multiprocessor computing environments because secure data can safely remain in cache in its unencrypted form even if software unrelated to the owner of the secure data is currently controlling the CPU environment that includes the cache.

BRIEF DESCRIPTION OF THE DRAWINGS

The foregoing and other purposes, aspects and advantages will be better understood from the following detailed description of an exemplary embodiment of the invention with reference to the drawings, in which.

EXEMPLARY EMBODIMENTS OF THE INVENTION

Figure 1:
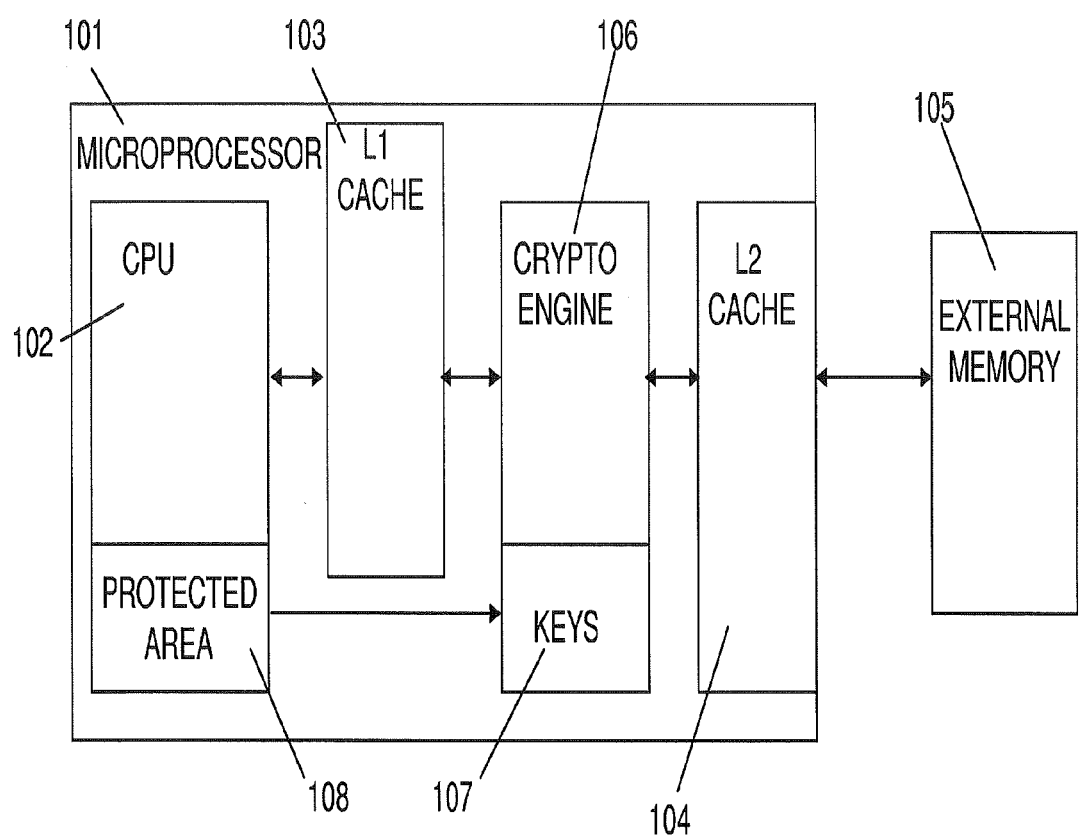
FIG. 1 exemplarily demonstrates a typical computer architecture appropriate for executing the secure object mechanism described in the parent application.

Referring now to the drawings, and more particularly to FIGS. 1-8, exemplary embodiments of the method and structures according to the present invention will now be discussed.

The co-pending patent application identified above described a computer architecture in which a secure object's private information is cryptographically protected from other software on the system. In this design, a secure object's private information is encrypted while in memory or on disk. A secure object's private information is "in the clear" only when it is accessed from inside the secure object and only while that information is inside the CPU. In this design, private information is decrypted on the path from external memory into the CPU and encrypted on the path from the CPU to external memory, as demonstrated by the exemplary architecture shown in FIG. 1.

To minimize cryptographic overhead and to maximize performance, private information in any L1, L2 or L3 caches that are on the CPU chip could be "in the clear" and the encryption and decryption done between the external memory and the on-chip caches. But if private information will be in the clear in the on-chip caches, it is necessary to provide mechanisms that will insure that a secure object's private information is not available to other software.

The parent application described one method for protecting information while it is in the caches. The current application describes another mechanism that allows all the data in the cache(s) to be in the clear without having to erase in-the-clear cache data when the CPU switches to another thread or process. It also supports architectures having one or more caches that are shared by multiple CPUs.

For example and referring again to FIG. 1, the present invention extends the capabilities of the secure object into architectures that potentially permit sharing of one or more levels of cache between processors in a multiprocessor system or between threads in a multi-threaded single or multi processor system. The present invention would also cover architectures in which the crypto engine 106 is located outside other cache levels. For example, both caches L1 and L2 103,104 shown in FIG. 1 might be inside the crypto engine 106, and this concept could be extended to even higher levels of cache such as an L3 cache.

Thus, the present invention provides a mechanism in which secure data can remain in the clear in the cache(s) without exposing that data to unrelated threads or processes, thereby eliminating the necessity to clear the cache(s) of secure data whenever unrelated software is executed by the CPU.

Figure 2:
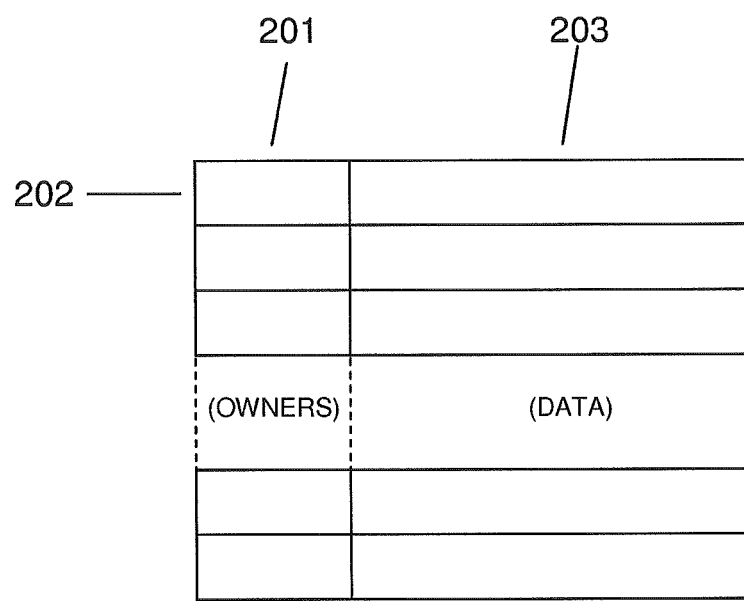
FIG. 2 exemplarily demonstrates a cache structure 200 having cache lines 202 using the object-id label 201 of the present invention.

This can be done by introducing an object-id 201 for each secure object and labeling each cache line 202 with the object-id of the secure object that "owns" the cache line (i.e. the secure object that loaded the cache line), as exemplarily shown for the cache 200 in FIG. 2.

A special value, like 0, for example, would be used for ordinary code that is not part of any secure object. A new register 304 (see FIG. 3), the object-id register, would store the object-id of the currently running secure object or 0, if ordinary, non-secure-object code is running. When the CPU 302 executes an instruction to load a value from memory, the caches are checked to see if the desired value is already in the cache. If it is not, the desired value is loaded from external memory in the usual manner, including the use of the crypto engine 106 if a secure object is executing, as described in the above-identified parent application. If the desired value is in the cache, the object-id label 201 on the cache line 202 is checked. If the label is 0, indicating that the cache line is not owned by any secure object, the desired value is loaded from the cache into the CPU in the usual manner. But if the label 201 indicates that the cache line is currently "owned" by a secure object, the object-id 201 of the cache line is compared to the object-id of the currently running code, using object-id register 304 (reference FIG. 3). If the two object-id's match, the value from the cache line is loaded into the CPU. If they do not match, this is considered a "cache miss". The currently running code will not get access to the unencrypted value in the cache line but, instead, will load the encrypted value from external memory. Alternatively, the encrypted data from external memory can be decrypted using the decryption key of the secure object making the request.

Figure 3:
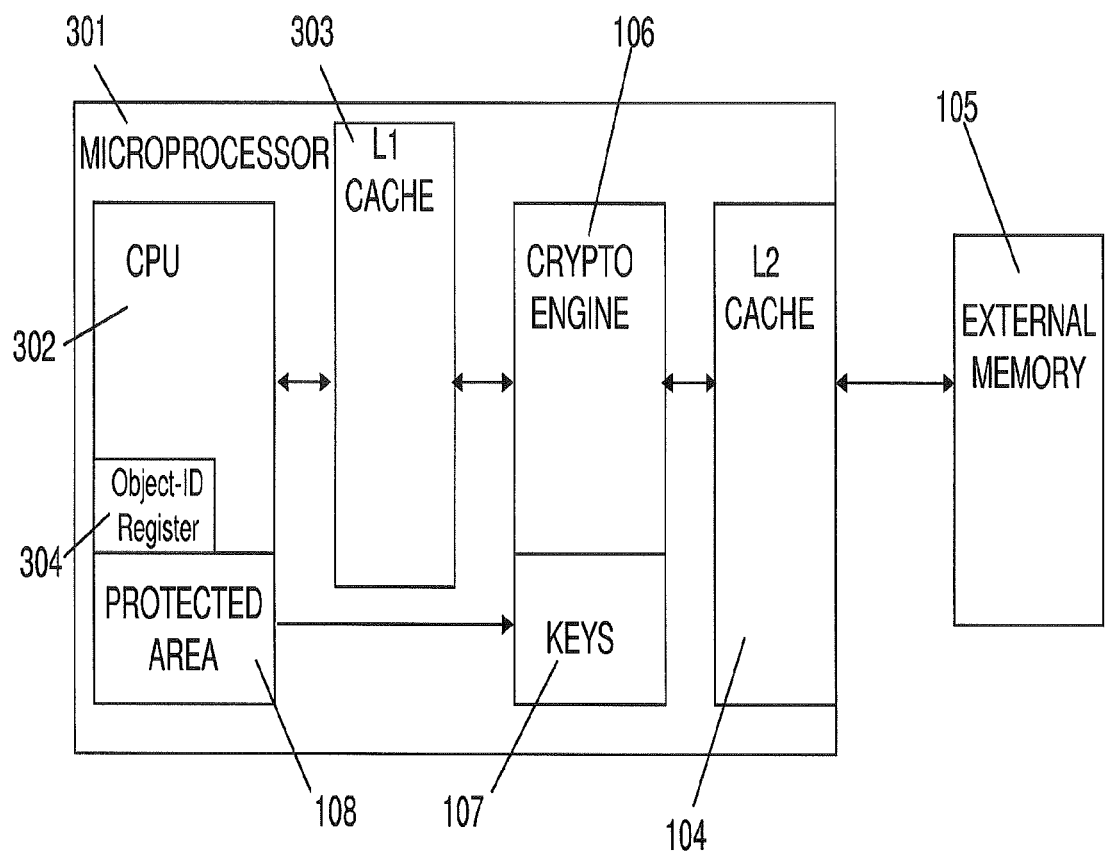
FIG. 3 demonstrates an exemplary embodiment 300 of the present invention.

FIG. 3 shows a computer architecture 300 corresponding to the architecture 100 of FIG. 1 used to explain the mechanism of the parent application and can be seen to differ by the addition of the object id register 304. Other components are similar to those described previously for FIG. 1, except that the L1 cache 303 would be modified to incorporate the object id data field (also referred to herein as the "owner" of the data in the cache line) and the cache controller would be modified to execute the method of the present invention, thereby resulting in a different microprocessor 301 and CPU 302 from those shown in FIG. 1.

Figure 4:
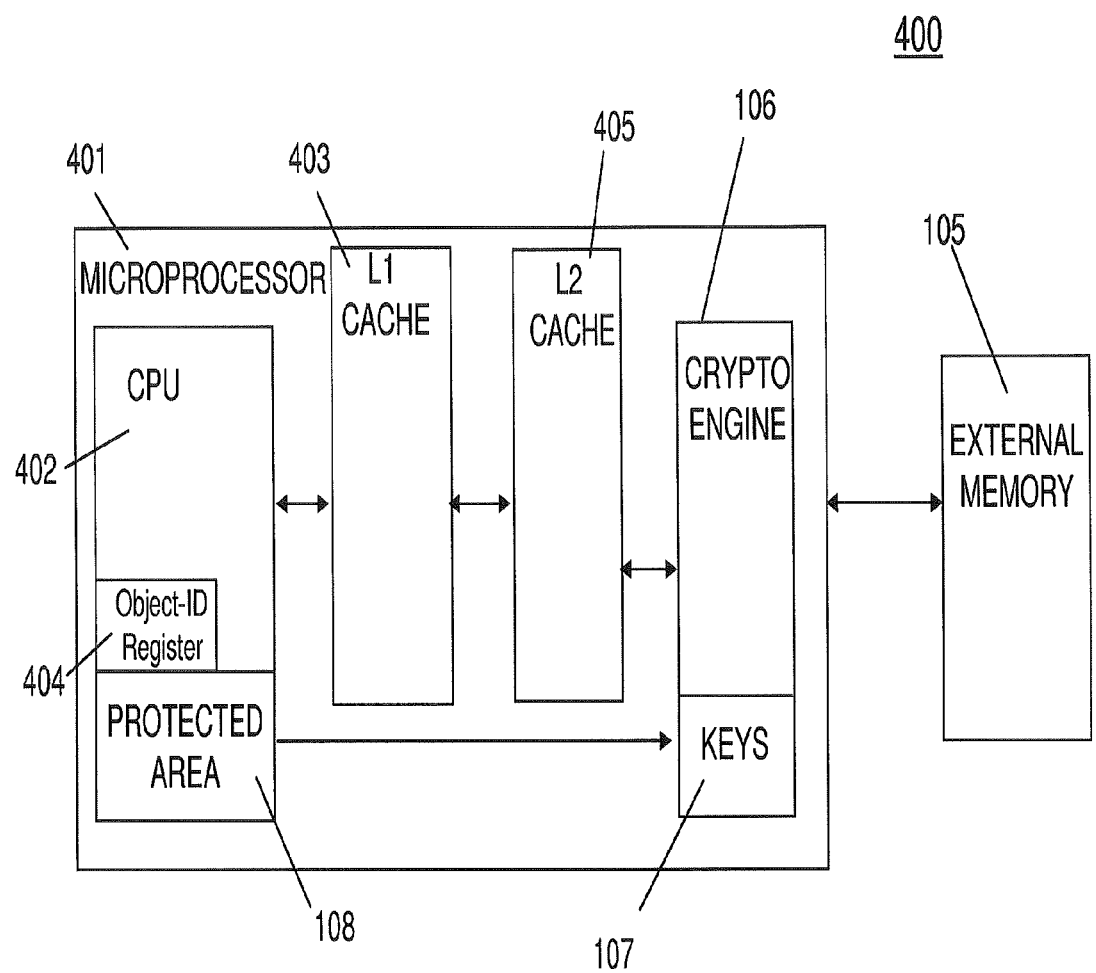
FIG. 4 demonstrates a variation 400 of the computer architecture for which the present invention is appropriate.

FIG. 4 shows another architecture 400 in which L2 405 is additionally converted into a cache structure with an object identification field for each line, and the concept shown in FIG. 4 could be used to include additional levels of cache (e.g., L3). This mechanism permits the crypto engine 106 to be used upon entry at the higher levels of cache, thereby increasing the efficiency of the data retrieval since secure data can be securely stored in multiple levels of cache without having to be repeatedly encrypted/decrypted as the secure object is intermittently executed by a CPU 402 in the system.

The configuration 400 of FIG. 4 is particularly useful as including all levels of cache located on the CPU microprocessor chip, including chips having more than one CPU and sharing one or more of the on-chip caches, since the crypto engine will operate only once upon initially retrieving a secure object from memory and then again as the secure object is flushed out of the caches back into memory. With the mechanism of the present invention, the decrypted data and/or code of a secure object can safely remain in a cache and can even be moved to different levels of cache even if the CPU executes a thread or process that is unrelated to the secure object.

Figure 5:
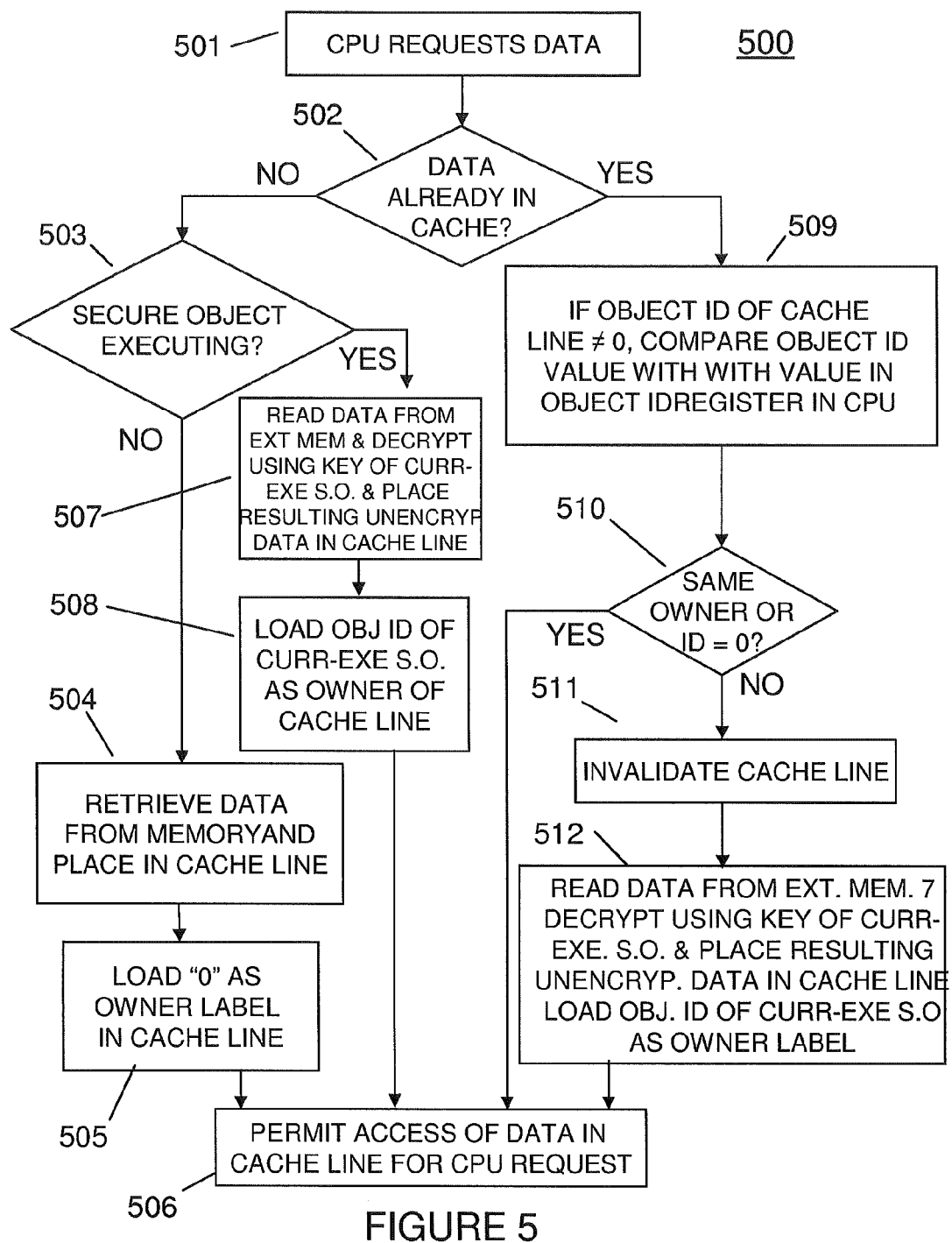
FIG. 5 demonstrates in flowchart format 500 the method used by the cache controller in the present invention.

FIG. 5 shows in flowchart format 500 an exemplary sequence of new steps taken by a cache controller designed to implement the method of an exemplary embodiment of the present invention. In step 502, upon a CPU request for data in step 501, the cache controller first determines whether the requested data already resides in cache. If not, then in step 503, the controller determines whether a secure object is executing, by checking whether the object-id value is 0 in CPU register 304/404 (reference FIGS. 3 and 4) storing the identification of the object currently executing on the CPU and making the request.

If no secure object is executing and making the request, in step 504 the data is retrieved from memory and placed in a cache line and, in step 505, since no secure object is involved, a "0" is placed in the object-id label of that cache line, and the data is made available to the CPU in step 506.

If a secure object is involved in the request, in step 507 the data is retrieved from memory and decrypted using the key of the currently executing secure object and placed in a line of the cache. In step 508 (or concurrently to step 507), the object-id label value of the currently executing secure object is stored in the owner field 201 of the cache line, and the decrypted data is made available to the CPU in step 506.

If the requested data is determined to already reside in cache (step 502) upon the request in step 501, then in step 509, the object-id label of the requested cache line is compared with the object-id of the currently running software in the object-id register 304/404 in the CPU 302/402, exemplarily shown in FIGS. 3 and 4. If the comparison 510 determines that the same owner is involved or if the owner of the cache line is 0, then the data in the cache line is made available in step 506.

If two different object-id's are detected in step 510, then in step 511, the cache controller invalidates the cache line and, in step 512, retrieves the encrypted version of the requested data from memory and decrypts the secure object data using the key of the currently executing secure object, and the data is made available to the CPU in step 506.

It is noted that, if a first secure object should cause invalidation of a second secure object's data, then, should the second secure object be again executed by the CPU and request that data, the data will be decrypted and loaded into the cache a second time.

The page demon is an example of a system program that reads memory "pages" of other programs, and writes those pages out to disk. When the page demon attempts to read a page of a secure object, a portion of that page may be in a cache and thus "in the clear". But if it is in the cache, the page demon will get a cache miss as described above since the page demon is not the secure object that owns the cache line and the page demon will read the encrypted value of the cache line from external memory. As a result, the page demon will store the encrypted version of a secure object on disk and the secure object will have the same protection when it is paged out to disk as it has when it is in memory.

The object-id label on a cache line is also used when a "dirty" cache line is pushed out to external memory so that the cache line will be encrypted with the keys of the secure object that owns the cache line.

Since the object-id register needs to contain the object-id of the currently running software, the esm instruction (described in co-pending patent application Ser. No. 12/492,738) will load the object-id register with an appropriate object-id value—which could be obtained from the decrypted handle described in the co-pending patent application. This appropriate object-id value will also be loaded into the object-id register after a context switch when a handle is restored to the handle register as discussed in the co-pending patent application.

In another exemplary design, the object-id would be created dynamically by the CPU hardware as part of the execution of the esm instruction.

Exemplary Hardware Implementation

Figure 6:
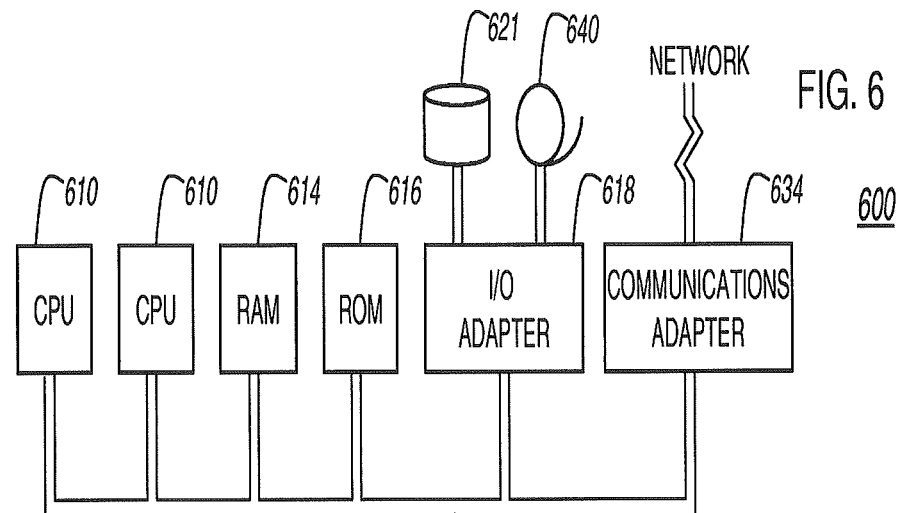
FIG. 6 illustrates an exemplary hardware/information handling system 600 for incorporating the present invention therein.
Figure 8:
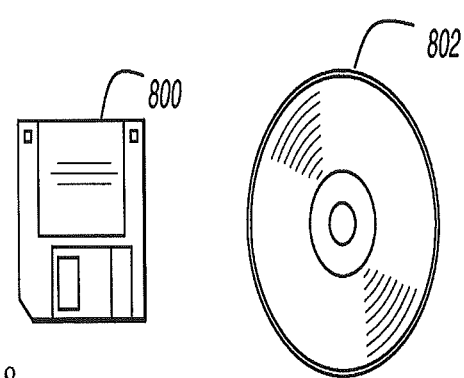
FIG. 8 illustrates exemplary signal bearing media 800 (e.g., storage medium) for storing steps of a program of a method according to the present invention, as a computer program product.

FIG. 6 illustrates a typical hardware configuration of an information handling/computer system 600 that might implement the invention described above and which preferably has at least one processor or central processing unit (CPU) 610.

The CPUs 610 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In accordance with the description above, the hardware of the present invention includes modifications to the cache structure that incorporate the owner identification field in each cache line of each cache that implements the present invention, along with modifications to the cache controller that would implement the method described exemplarily in FIG. 5.

Figure 7:
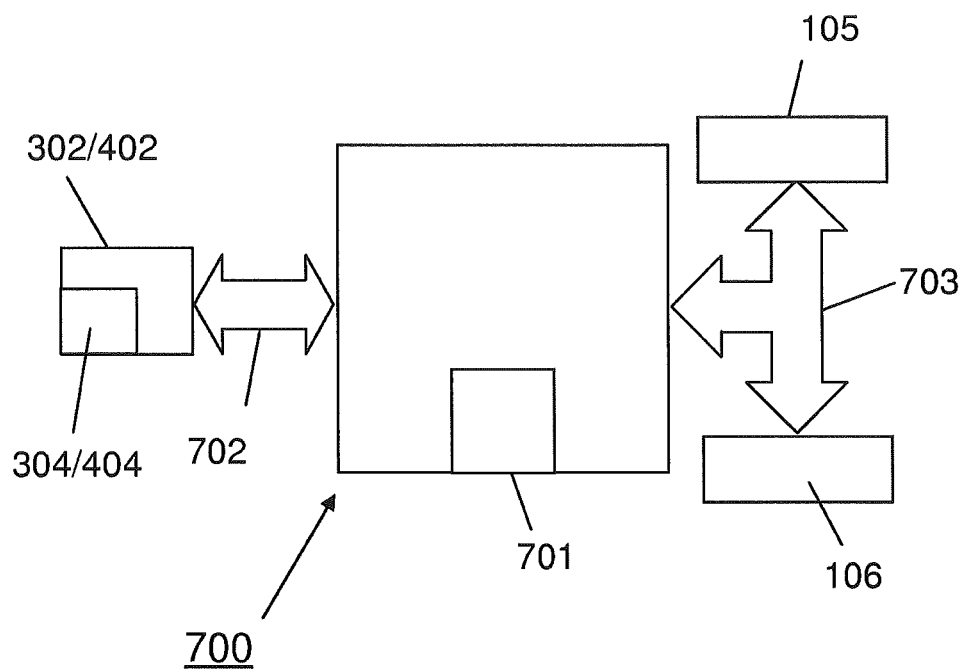
FIG. 7 illustrates an exemplary cache controller 700 that implements the concepts of the present invention.

Thus, FIG. 7 shows how a cache controller 700 could exemplarily be implemented as incorporating concepts of the present invention. In one exemplary embodiment, the cache controller 700 could comprise a microprocessor or microcontroller including a memory device 701 such as a PROM or ROM that stores the instructions reflecting the flowchart shown in FIG. 5. The microprocessor 700 also includes a data port receiving the value of the object-id register 304/404 of CPU 302/402 via bus 702, as well as a data port to interact with bus 703 as interface to data in a memory 105 or higher-level cache, perhaps via crypto engine 106.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a cache controller of a digital data processor incorporating the CPU 610 and hardware above, to perform the method of the invention.

This signal-bearing storage media may include, for example, a RAM contained within the CPU 610 as represented by the fast-access storage, for example, for purpose of downloading those instructions onto a cache controller for subsequent execution by that controller. Alternatively, the instructions may be contained in another signal-bearing storage media, such as a magnetic data storage diskette 800 or optical storage disk 802 (FIG. 8), directly or indirectly accessible by the CPU 610.

Whether contained in the diskette 800, the disk 802, the computer/CPU 610, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including storage devices in transmission devices and including devices in either digital or analog formats and devices in communication links and wireless. In an illustrative embodiment of the invention, the machine-readable instructions may comprise software object code.

While the invention has been described in terms of exemplary embodiments, those skilled in the art will recognize that the invention can be practiced with modification within the spirit and scope of the appended claims.

Thus, for example, although FIGS. 1, 3, and 4 exemplarily show interconnections between the various components, these interconnections indicate exemplary information exchanges and the components could actually be interconnected via common buses so that the components are interconnected via one or more common data and/or control buses so that various combinations of information interconnection are possible by selectively controlling the input/output ports of the various components.

Additionally, although the exemplary embodiments refer to cache levels, such as on-chip caches, it should be clear that the concepts of the invention extend beyond caches on the same chip and, indeed, the concepts could even extend beyond cache levels. That is, the present invention should be considered as appropriate in any architecture supporting the secure object concept described in the parent application in which a crypto engine is used to decrypt data and/or code when a secure object is retrieved from its encrypted format from a memory. The mechanism of the present invention could be used to permit the crypto engine to be located in different locations of the cache/memory system while maintaining an efficient and secure environment for the secure objects while in the decrypted state.

Further, it is noted that, Applicants' intent is to encompass equivalents of all claim elements, even if amended later during prosecution.

Having thus described my invention, what I claim as new and desire to secure by Letters Patent is as follows:

1. A method that protects a confidentiality and an integrity of information in a secure object from other software on the system, said secure object comprising information that is cryptographically protected from the other software on the system, said method comprising:
   decrypting and integrity-checking information in the secure object as said information is brought into a cache from external memory;
   encrypting and generating an integrity value as information in the secure object moves from the cache to external memory;
   storing an object-id value that identifies a software that is currently executing in a CPU (Central Processing Unit), said value having a predetermined standard value when software that is not a secure object is executing;
   augmenting each block of information in the cache with an ownership field that is used to store an identification of the software that owns the information in said each block;
   comparing, when software attempts to access information in one of said blocks, the object-id of the currently executing software with a content of the ownership field of the block being accessed; and
   allowing access to the block if the object-id of the currently executing software matches the object-id in the ownership field of the block, allowing access if the ownership field of the block is not the object-id of a secure object, and treating the access as a "cache miss" otherwise.

2. The method of claim 1, further comprising:
   upon loading data into said block in the cache, additionally loading into the ownership field associated with said block the object-id of the currently executing software.

3. The method of claim 1, wherein said secure object comprises a data structure tangibly embodied in a machine-readable medium and containing encrypted data when said secure object is stored in an external memory, said encrypted data being decrypted when information from said secure object is retrieved from said external memory into said cache during execution of said secure object by said CPU, said secure object having one or more structural components that protect both a confidentiality and an integrity of the secure object.

4. The method of claim 1, further comprising:
   if the ownership field of a cache block does not match the object-id value of the currently executing software and the ownership field is not the predetermined standard value that indicates software that is not a secure object:
   invalidating the requested cache block;
   retrieving from said external memory data corresponding to said requested block of data;
   loading said data into said cache block either without a decryption of said data, if software that is not a secure object is executing, or decrypting said retrieved data using a decryption key of the currently executing secure object; and
   permitting an access to said data in said cache block for the CPU making the access request.

5. The method of claim 4, as embodied in a set of instructions tangibly embodied on a non-transitory machine-readable storage medium.

6. The method of claim 5, wherein said set of instructions comprises one of:
   firmware instructions controlling a cache controller; and
   a set of computer instructions tangibly embedded on a tangible storage medium, in preparation for loading onto a memory device in a cache controller.

7. The method of claim 1, wherein the access permitted when the object-id in the ownership field is not that of a secure object allows a secure object to communicate with other software.

8. The method of claim 3, wherein a value for an integrity mechanism is updated when the information of the secure object is encrypted and returned to said external memory.

9. The method of claim 1, where said cache comprises a multi-level cache comprising an L1 cache and an L2 cache.

10. The method of claim 9, wherein said cache further comprises an L3 cache.

11. An apparatus in a processor that protects a confidentiality and an integrity of a secure object, said apparatus comprising:
   a cache including a plurality of blocks of information, each said block having an owner field identifying an owner, if any, of data stored in said block; and
   a cache controller that allows an access of data stored in one of said blocks when a value indicative of said owner identified in said owner field of said block matches an object identification value of a secure object making a request and also allows an access when a value in said owner field indicates that the data in said block is not owned by a secure object, wherein:
information in the secure object is decrypted and integrity-checked as the secure object information is brought into said cache from an external memory, and information in the secure object is encrypted and an integrity value is generated when information of the secure object moves from the cache to the external memory.

12. The apparatus of claim 11, wherein a predetermined value is used in said owner field if the data stored in said block is not owned by a secure object.

13. The apparatus of claim 11, wherein values in said owner field identify a specific secure object associated with said data, said secure object comprising a data structure containing at least one of encrypted data and encrypted code when said secure object is stored in an external memory, said data being decrypted when said secure object is retrieved from said external memory into said cache for execution of said secure object by a central processing unit (CPU) in said apparatus.

14. The apparatus of claim 13, further comprising:
an object-id register that stores an identification value of software currently executing on the CPU,
wherein said cache controller, upon an access request for data in a block of said cache, initially determines whether a value stored in said owner field of said block of cache matches a value stored in said object-id register.

15. The apparatus of claim 14, wherein:
if the value stored in the owner label field matches the value stored in the object-id register or indicates that no secured data is stored in the requested cache block, said cache controller permits access to the data stored in the requested block of cache, and
if the values fail to match and the value stored in the owner field indicates secured data, the cache controller declares a cache miss.

16. The apparatus of claim 15, wherein, if a cache miss is declared, the cache controller:
invalidates the requested cache block of data;
retrieves from a memory data corresponding to said requested block of data;
loads said data into said cache block without a decryption of said data if the software executing is not a secure object and with a decryption of data if the software executing is a secure object; and
permits an access to said data for the CPU making the access request.

17. The apparatus of claim 11, wherein said cache and said cache controller comprise a cache and cache controller in a first level of a cache hierarchy on said apparatus, said cache hierarchy including a second level cache and cache controller, said second level cache also including a plurality of blocks of information, each said block having an owner field identifying an owner, if any, of data stored in said block, and said second level cache controller controls an access of said data stored in said block as based upon whether said access has been made by said owner identified in said owner identification field or a value in the owner identification field indicates that non-secured data is stored in said block.

18. A cache controller that controls a cache in a system that protects a confidentiality and an integrity of information in a Secure Object from other software, said cache controller comprising:
means for receiving a value when a process or thread requests an access to data stored in a block in the cache, said value identifying the process or thread that is making the request; and
means for causing said cache controller to:
compare the received value with an ownership value for the block in the cache; and
allow access to contents of the block in the cache if the object-id of the currently executing software matches the object-id in an owner field of the block in the cache, allow access if the owner field is not the object-id of a secure object, and treat the access as a "cache miss" otherwise,
wherein:
information in the secure object is decrypted and integrity-checked as the secure object information is brought into said cache from an external memory, and
information in the secure object is encrypted and an integrity value is generated when information of the secure object moves from the cache to the external memory.

19. The cache controller of claim 18, wherein, if a cache miss is declared for a requested block in the cache, said cache controller:
invalidates the requested block in the cache;
reads data from an external memory;
executes one of the following:
stores the data into said requested block in the cache; and
decrypts said data using a decryption key of a secure object making said request identified by the object-id register and stores the decrypted data into said requested block in the cache; and
provides access to the data stored in the requested block in the cache.

20. A method that protects a confidentiality and an integrity of information in a secure object from other software on the system, said secure object comprising information that is cryptographically protected from the other software on the system, said method comprising:
decrypting and integrity-checking information in the secure object as said information is brought into a cache from an external memory;
encrypting and generating an integrity value as information in the secure object moves from the cache to said external memory;
using an object-id value that identifies a software that is currently executing in the CPU, said value having a predetermined standard value when software that is not a secure object is executing;
augmenting each entry in the cache with an ownership field that is used to store an identification of the software that owns data in said each cache entry;
comparing, when software attempts to access information in one of said cache entries, the object-id value that identifies the software that is currently executing with a content of the ownership field of the cache entry being accessed; and
allowing access to the contents of the cache entry if the object-id of the currently executing software matches the object-id in the ownership field of the cache entry, allowing access if the ownership field of the cache entry is not the object-id of a secure object, and treating the access as a "cache miss" otherwise.

* * * * *